Nov. 26, 1968  S. DRAKE  3,413,030
LOAD RELEASE APPARATUS
Filed Oct. 19, 1966  2 Sheets-Sheet 1
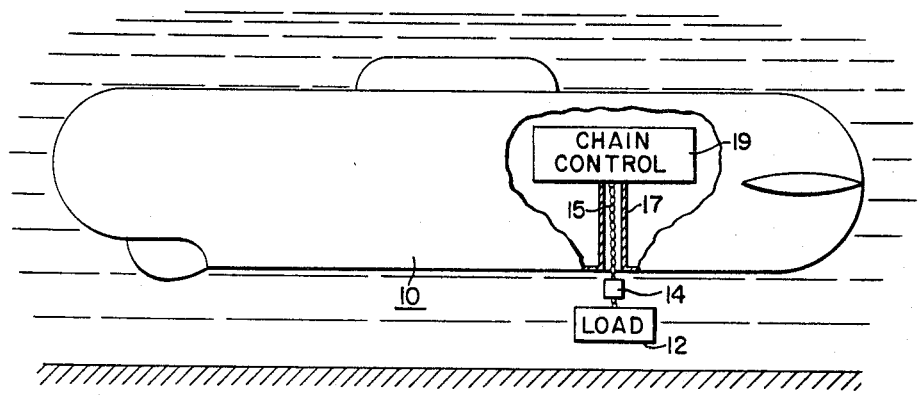
FIG.1.
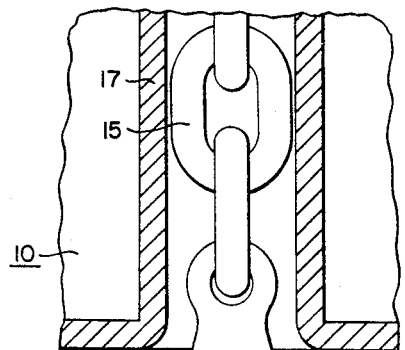
FIG.2.
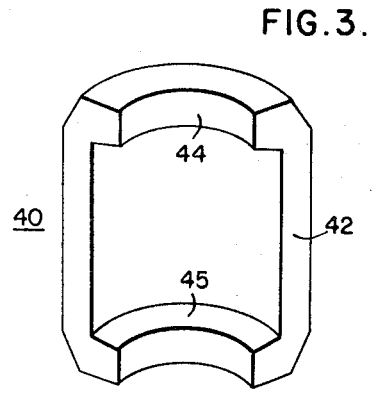
FIG.3.
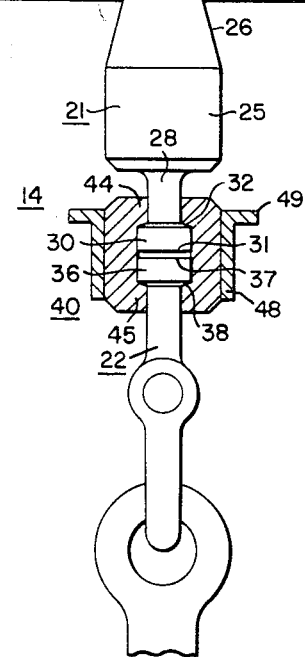
INVENTOR
Stephen Drake
BY Dean Schron
ATTORNEY United States Patent Office
3,413,030
Patented Nov. 26, 1968

3,413,030
LOAD RELEASE APPARATUS
Stephen Drake, Santa Clara, Calif., assignor to Westinghouse Electric Corporation, Pittsburgh, Pa., a corporation of Pennsylvania
Filed Oct. 19, 1966, Ser. No. 587,915
5 Claims. (Cl. 294—83)

ABSTRACT OF THE DISCLOSURE

Upper and lower flanged link members of a release device are maintained in axially aligned position by means of a plurality of collar segments, restrained from separating by means of a cylindrical sleeve. By withdrawing the release mechanism into a pipe, the cylindrical sleeve is forced off the collar segments which are then retained by the pipe. As the release mechanism is lowered back out of the pipe the segments are no longer restrained and disconnection takes place.

---

This invention in general relates to materials handling, and in particular to a load release apparatus.

In many underwater situations it becomes necessary for an undersea vehicle to deposit an externally carried load at a designated location. Where diver prohibitive depths are encountered it is important that the disconnection of the load from the carrying vehicle be effected without the need for diver intervention.

It is therefore one object of the present invention to provide a load release mechanism for an underwater vessel which is completely operable from within the vessel.

Another object is to provide a relatively simple load release mechanism so that disconnection of a load may be carried out without need of human invention.

In one type of load release mechanism for an underwater vehicle, the load is supported by a chain communicative with a release control within the vehicle. Release of the load is effected by release of the entire chain. In many situations it is imperative that the chain does not come in contact with the released load, as might happen if the entire chain was released.

It is therefore another object of the present invention to provide a load release mechanism in which the load carrying tension member, such as the chain, is not released to fall upon the load.

A further object is to provide a highly reliable load release mechanism.

Briefly, in accordance with the above objects, there is provided a load reelase apparatus including upper and lower link members with the lower link member being for connection to a load and the upper link member being for connection to a load supporting tension member such as a chain. Separable collar means connects the upper and lower link members and, in conjunction with a retaining means associated with the collar, functions to maintain a positive connection between the upper and lower link members. An arrangement forming a releasing means is provided in order to release the retaining means for allowing separation of the collar whereby a disconnection of the upper and lower link members takes place, and consequently a release of the load.

In a preferred embodiment, the upper and lower link members each include an end flange having an end surface and an associated shoulder surface. The separable collar means is formed from a plurality of collar segments, each being approximately C-shaped in that each includes an elongated main body portion connecting upper and lower projections. The upper and lower projections of the collar segments engage the shoulder surfaces of the end flanges of the upper and lower links, respectively.

In one embodiment the retaining means for preventing separation of the collar segments takes the form of a cylindrical member which slides over the segmented collar configuration to insure a positive holding action of the load. To effect disconnection of the load, means are provided to slide the cylindrical retaining means from its holding position.

The above stated, as well as other objects, advantages and uses, will become apparent upon a reading of the following detailed specification taken in conjunction with the drawings, in which:

FIGURE 1 illustrates, partially in cut away, and partially in cross section, an undersea vehicle together with a load release apparatus;

FIG. 2 illustrates, partially in cross section, apparatus according to the present invention, in one stage of operation;

FIG. 3 illustrates a collar segment of FIG. 1 in more detail; and

Figure 4:
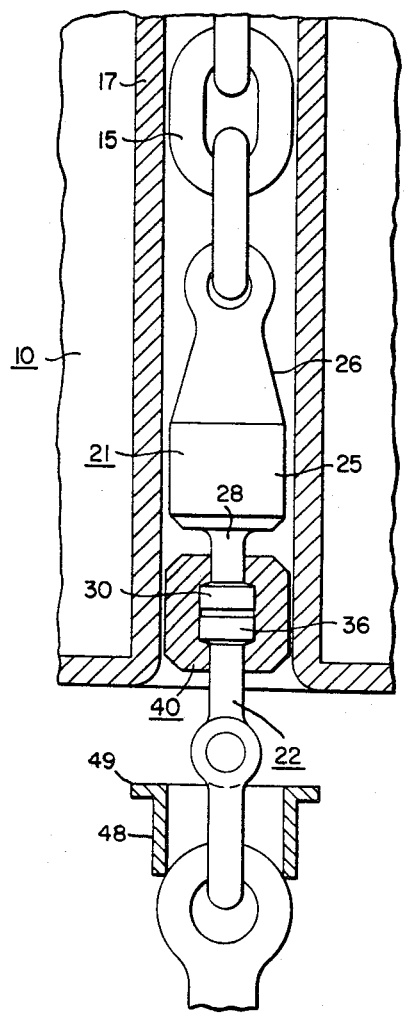
FIGS. 4 and 5 illustrate subsequent stages of operation of the apparatus of FIG. 2.

Referring now to FIG. 1, there is illustrated an underwater research vehicle 10 having an externally carried load 12 for deposition at a designated location. A portion of the vehicle 10 has been cut away to further illustrate components associated with the load release apparatus. A coupling means 14 illustrated in block form connects the load 12 with a load supporting tension member in the form of chain 15 which is operable to move vertically in a restricted passageway or guide in the form of pipe 17 which may be formed as part of the hull of the vehicle 10. The vertical movement of the chain 15 is under the control of chain control means 19.

FIG. 2 illustrates in detail a preferred embodiment of the present invention. Operation of the load release apparatus will be described with respect to the application as illustrated in FIG. 1 and, accordingly, in FIG. 2 there is illustrated the underwater research vehicle hull 10 and the built-in pipe 17.

Upper and lower link members 21 and 22 form part of the mechanism coupling the chain 15 with the load. Link 21 includes an upper body portion 25 having a tapered surface 26, a shank portion 28, and an end flange portion 30 having an end surface 31 and a shoulder surface 32, preferably having a slight degree of taper for a purpose to be hereinafter described.

In a similar fashion, lower link 22 includes an end flange portion 36 having an end surface 37 adjacent to, and in line with, the end surface 31 of flange 30 and a shoulder surface 38, which may also have a slight degree of taper.

The coupling arrangement for preventing separation of links 21 and 22 includes separable collar means in the form of a plurality of collar segments 40, one of the collar segments being illustrated in FIG. 3. The collar segment 40 includes an elongated main body portion 42 having upper and lower projections 44 and 45, respectively, and it is seen that a cross section through a vertical plane of the collar segment 40 results in a cross section which may be described as C-shaped.

Referring back to FIG. 2, in a preferred embodiment, the upper link 21 is formed of rolled stock which may be turned down on a lathe to the desired shape and, consequently, the end flange portion 30 (and end flange portion 36 of link 22) has a circular cylindrical side surface and each collar segment 40 is formed to generally conform to the shape of the end flanges 30 and 36 with the upper projection 44 of each collar segment being in engagement with the shoulder surface 32 of flange 30 and with each lower projection 45 being in engagement with shoulder surface 38 of flange 36. The collar segments 40 may substantially surround the flanges 30 and 36 for 360°, and to insure for positive disengagement together with ease of initial engagement three collar segments may be utilized.

In order not to have the collar segments 40 separate when a load is being carried, there is provided a retaining means which is operable to counter the outward forces produced by the collar segments under load conditions. The retaining means takes the form of circularly cylindrical retaining sleeve 48 which slides over the plurality of collar segments 40, and includes a peripheral flange 49 at the upper and thereof.

To effect disconnection of the upper and lower links 21 and 22, and therefore of the load, the collar segments 40 must be separated and the present invention makes provision for releasing or removing the retaining sleeve 48 in order to accomplish the disconnection. Disconnection is begun by activation of the chain control means 19 (FIG. 1) to withdraw the chain 15 for a short distance into the pipe 17. As the chain 15 is being withdrawn into the pipe 17 the tapered surface 26 of the upper link 21 insures that the upper link 21 is properly guided into the pipe without catching or snagging.

FIG. 4 illustrates the results of the chain control activation previously mentioned. As the chain 15 is pulled upwards in the pipe 17, the peripheral flange 49 of the retaining sleeve 48 contacts the lower end of pipe 17. Continual upward movement of the chain 15 forces the retaining sleeve 48 off of the collar segments 40, however, as illustrated in FIG. 4, the collar segments 40 are prevented from separating since the pipe 17 now acts as a temporary retaining sleeve.

Figure 5:
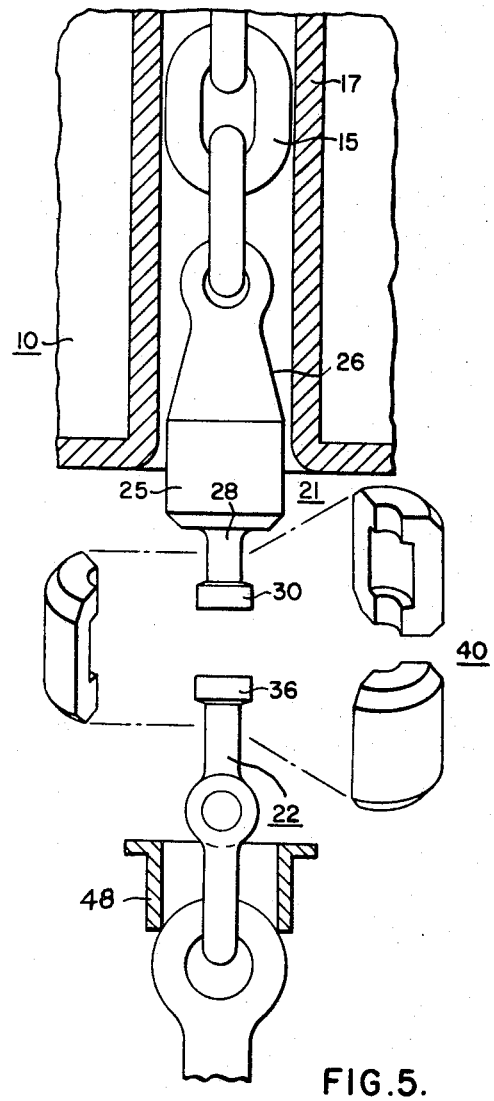

As illustrated in FIG. 5, when the chain 15 is again lowered relative to the pipe 17, a situation is presented where the collar segments 40 no longer have any retaining means associated therewith and consequently are forced out of engagement with upper and lower flanges 30 and 36 whereupon the load drops into its desired position. The separating action is enhanced by the provision of the aforementioned tapered shoulder surface 32 which insures that the upper projections 44 of the collar segments 40 slide off easily under the weight of the load.

In one embodiment the load release apparatus has been described in conjunction with an undersea vehicle and wherein the load supporting tension member, chain 15, is withdrawn into the pipe to slide the retaining means, sleeve 48, off of the collar segments 40 while still preventing separation of the collar. It is obvious that this operation can find utility in surface or air operations where a relatively simple, compact and highly reliable release mechanism is required.

Although the present invention has been described with a certain degree of particularity, it should be understood that the invention is not limited to the specific structure shown. For example, and within the confines of the invention, the upper and lower link members may take on various shapes, different forms of separable collar means may be utilized in conjunction with an activating means for removing the retaining means, and although the link members have been designated "upper" and "lower" other orientations, such as horizontal with a pulling load may be utilized. Obviously, many other modifications are made possible in the light of the teachings herein.

I claim as my invention:
1. Load release apparatus comprising:
 (A) upper and lower link members,
  (1) said lower link member being for connection to a load;
  (2) said upper link member being for connection to a load supporting tension member;
 (B) separable collar means including a plurality of collar segments, connecting said upper and lower link members;
 (C) retaining means for preventing separation of said collar means, said retaining means surrounding and being slidable relative to said plurality of collar segments;
 (D) means for releasing said restraining means for allowing separation of said collar means to effect disconnection of said load;
 (E) said means for releasing including a restricted passageway into which said tension member is relatively withdrawn;
 (F) said retaining means sliding off said collar means in response to contact with said restricted passageway;
 (G) said restricted passageway thereafter restraining separation of said collar means until said collar means is removed therefrom.
2. Apparatus according to claim 1 wherein:
 (A) the collar means is removed from the restricted passageway by relatively lowering the tension member.
3. Apparatus according to claim 1 wherein:
 (A) the restricted passageway is a pipe structure; and wherein
 (B) the retaining means is a sleeve having a projection portion which contacts the lower end of said pipe structure to prevent the retaining means from being fully withdrawn into said pipe structure.
4. Apparatus according to claim 3 wherein:
 (A) the sleeve is cylindrical; and
 (B) the projection portion is a peripheral flange around the upper portion of said cylindrical sleeve.
5. Apparatus according to claim 1 wherein:
 (A) the upper link member includes an upper body portion having a surface which tapers toward the tension member to facilitate smooth entry into the restricted passageway.

References Cited
UNITED STATES PATENTS

| | | | |
|---|---|---|---|
| 847,152 | 3/1907 | Beebe | 294—82 |
| 2,925,298 | 2/1960 | Robins | 294—78 |
| 3,032,360 | 5/1962 | Woodings | 287—108 |
| 3,081,122 | 3/1963 | Jungerson | 294—83 |
| 3,240,520 | 3/1966 | Dailey | 294—83 |

RICHARD E. AEGERTER, *Primary Examiner.*

H. C. HORNSBY, *Assistant Examiner.*